(12) United States Patent
Miyazaki et al.

(10) Patent No.: US 12,492,898 B2
(45) Date of Patent: Dec. 9, 2025

(54) SENSOR AND ELECTRONIC DEVICE (71) Applicant: KABUSHIKI KAISHA TOSHIBA, Tokyo (JP)

(72) Inventors: Fumito Miyazaki, Yokohama Kanagawa (JP); Hiroki Hiraga, Saitama Saitama (JP); Kengo Uchida, Kawasaki Kanagawa (JP); Shiori Kaji, Kawasaki Kanagawa (JP); Yasushi Tomizawa, Tokyo (JP); Kei Masunishi, Kawasaki Kanagawa (JP); Daiki Ono, Yokohama Kanagawa (JP); Ryunosuke Gando, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 296 days.

(21) Appl. No.: 18/172,455

(22) Filed: Feb. 22, 2023

(65) Prior Publication Data
US 2024/0060777 A1 Feb. 22, 2024

(30) Foreign Application Priority Data
Aug. 16, 2022 (JP) .................................. 2022-129696

(51) Int. Cl.
G01C 19/56 (2012.01)
(52) U.S. Cl.
CPC .................... G01C 19/56 (2013.01)
(58) Field of Classification Search
None
See application file for complete search history.

(56) References Cited

U.S. PATENT DOCUMENTS 5,864,064 A 1/1999 Kano et al.
10,767,992 B2 9/2020 Ikehashi
(Continued)

FOREIGN PATENT DOCUMENTS

JP H09-145740 A 6/1997
JP 2009-130328 A 6/2009
(Continued)

OTHER PUBLICATIONS

Japan Patent Office, Office Action in JP App. No. 2022-129696 (Jun. 17, 2025).

*Primary Examiner* — Mark A Shabman
(74) *Attorney, Agent, or Firm* — Finnegan, Henderson, Farabow, Garrett & Dunner, LLP (57) ABSTRACT

According to one embodiment, a sensor includes a base body, a support member, and a movable member. The base body includes a first face including a first base region. The support member is fixed to the first base region. The support member includes a support portion and an extending portion. The extending portion is connected to the support portion. The extending portion extends along a second direction crossing a first direction from the first base region to the support portion. A first width of the support portion in a third direction crossing a plane including the first direction and the second direction is wider than a second width of the extending portion in the third direction. The movable member is supported by the extending portion. A first gap is provided between the first face and the movable member.

18 Claims, 10 Drawing Sheets

(56) References Cited

U.S. PATENT DOCUMENTS

| | | | |
|---|---|---|---|
| 11,796,319 B2* | 10/2023 | Miyazaki | G01C 19/5712 |
| 2013/0049212 A1* | 2/2013 | Hata | G01C 19/5762 |
| | | | 257/773 |
| 2016/0097792 A1* | 4/2016 | Naumann | G01P 15/18 |
| | | | 73/504.02 |
| 2017/0227572 A1* | 8/2017 | Malvern | G01P 15/097 |
| 2019/0162750 A1* | 5/2019 | Tanaka | G01P 15/097 |
| 2020/0039814 A1* | 2/2020 | Tanaka | G01P 15/125 |
| 2020/0067479 A1* | 2/2020 | Ikehashi | H03H 9/2431 |
| 2020/0284582 A1 | 9/2020 | Kaji et al. | |
| 2020/0363205 A1 | 11/2020 | Gando et al. | |
| 2021/0063432 A1* | 3/2021 | Fujimoto | G01P 13/04 |
| 2021/0381831 A1 | 12/2021 | Gando et al. | |
| 2021/0396780 A1* | 12/2021 | Masunishi | G01P 15/125 |
| 2022/0137085 A1 | 5/2022 | Masunishi et al. | |
| 2022/0259035 A1 | 8/2022 | Masunishi et al. | |
| 2022/0268583 A1 | 8/2022 | Gando et al. | |
| 2022/0276052 A1 | 9/2022 | Hiraga et al. | |
| 2022/0326013 A1 | 10/2022 | Miyazaki et al. | |
| 2023/0062441 A1 | 3/2023 | Masunishi et al. | |
| 2023/0143243 A1 | 5/2023 | Ono et al. | |

FOREIGN PATENT DOCUMENTS

| | | |
|---|---|---|
| JP | 2012-215505 A | 11/2012 |
| JP | 2020-144065 A | 9/2020 |
| JP | 2020-187018 A | 11/2020 |
| JP | 2021-16923 A | 2/2021 |
| JP | 2021-192012 A | 12/2021 |
| JP | 2022-1828 A | 1/2022 |
| JP | 2022-74658 A | 5/2022 |
| JP | 2022-125454 A | 8/2022 |
| JP | 2022-129691 A | 9/2022 |
| JP | 2022-131004 A | 9/2022 |
| JP | 2022-162641 A | 10/2022 |
| JP | 2023-36260 A | 3/2023 |
| JP | 2023-69581 A | 5/2023 |

* cited by examiner

SENSOR AND ELECTRONIC DEVICE

CROSS-REFERENCE TO RELATED APPLICATIONS

This application is based upon and claims the benefit of priority from Japanese Patent Application No. 2022-129696, filed on Aug. 16, 2022; the entire contents of which are incorporated herein by reference.

FIELD

Embodiments described herein relate generally to a sensor and an electronic device.

BACKGROUND

There are sensors such as gyro sensors. Stable characteristics are desired in sensors and electronic devices.

DETAILED DESCRIPTION

According to one embodiment, a sensor includes a base body, a support member, and a movable member. The base body includes a first face including a first base region. The support member is fixed to the first base region. The support member includes a support portion and an extending portion. The extending portion is connected to the support portion. The extending portion extends along a second direction crossing a first direction from the first base region to the support portion. A first width of the support portion in a third direction crossing a plane including the first direction and the second direction is wider than a second width of the extending portion in the third direction. The movable member is supported by the extending portion. A first gap is provided between the first face and the movable member.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
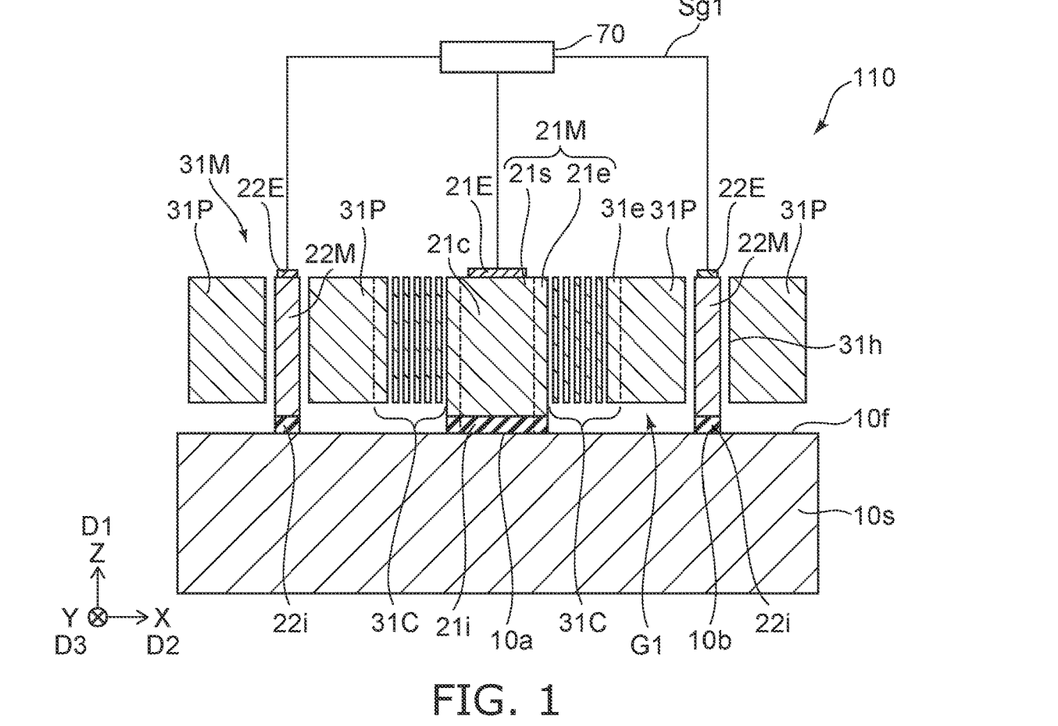
FIG. 1 is a schematic cross-sectional view illustrating a sensor according to a first embodiment.
Figure 2:
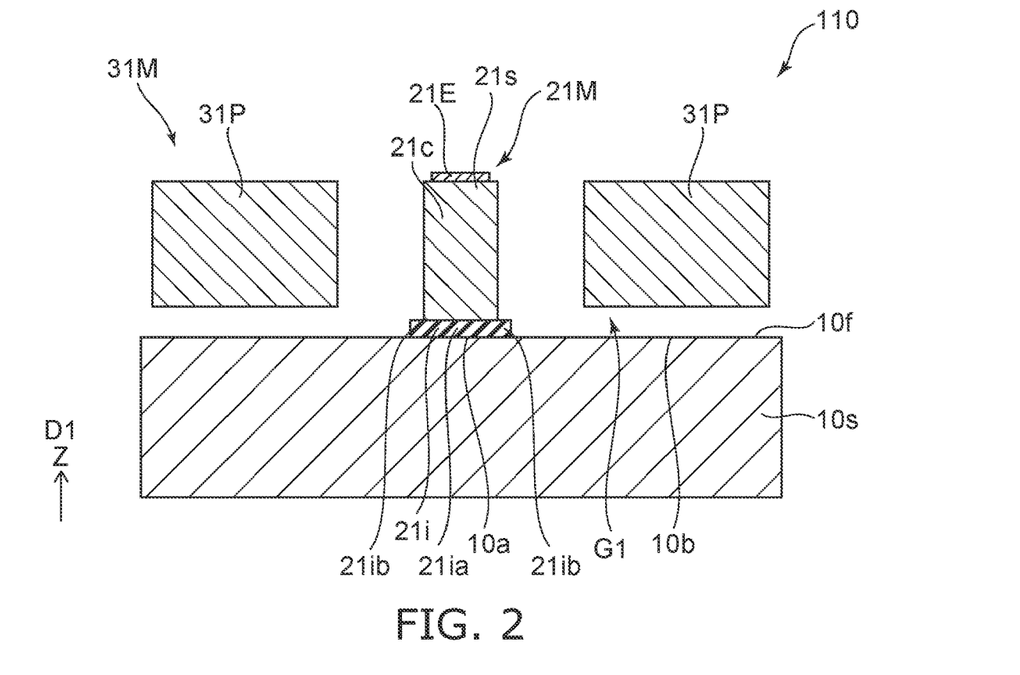
FIG. 2 is a schematic cross-sectional view illustrating a sensor according to the first embodiment.

FIGS. 1 and 2 are schematic cross-sectional views illustrating a sensor according to a first embodiment.

Figure 3:
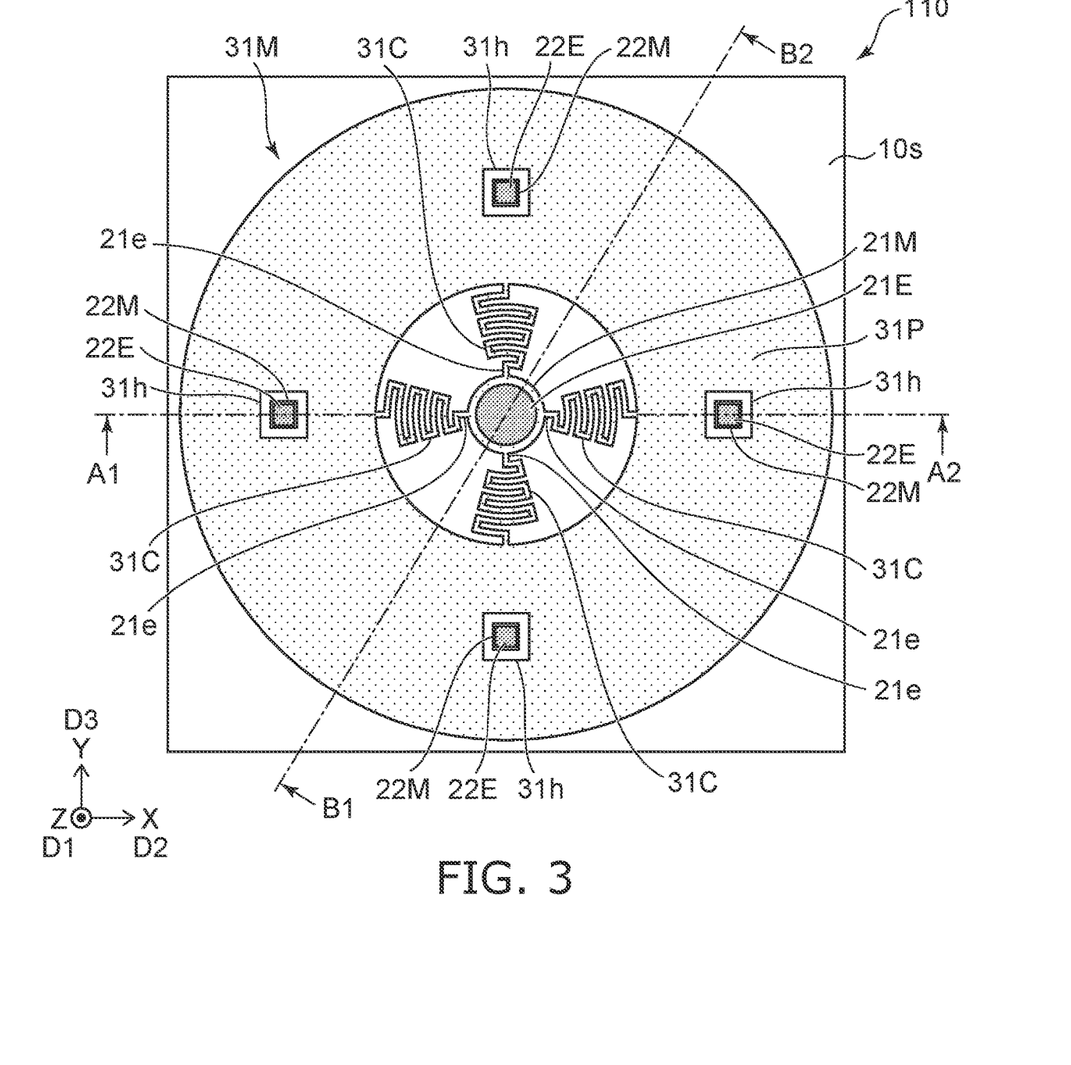
FIG. 3 is a schematic plan view illustrating the sensor according to the first embodiment.

FIG. 3 is a schematic plan view illustrating the sensor according to the first embodiment.

Figure 4:
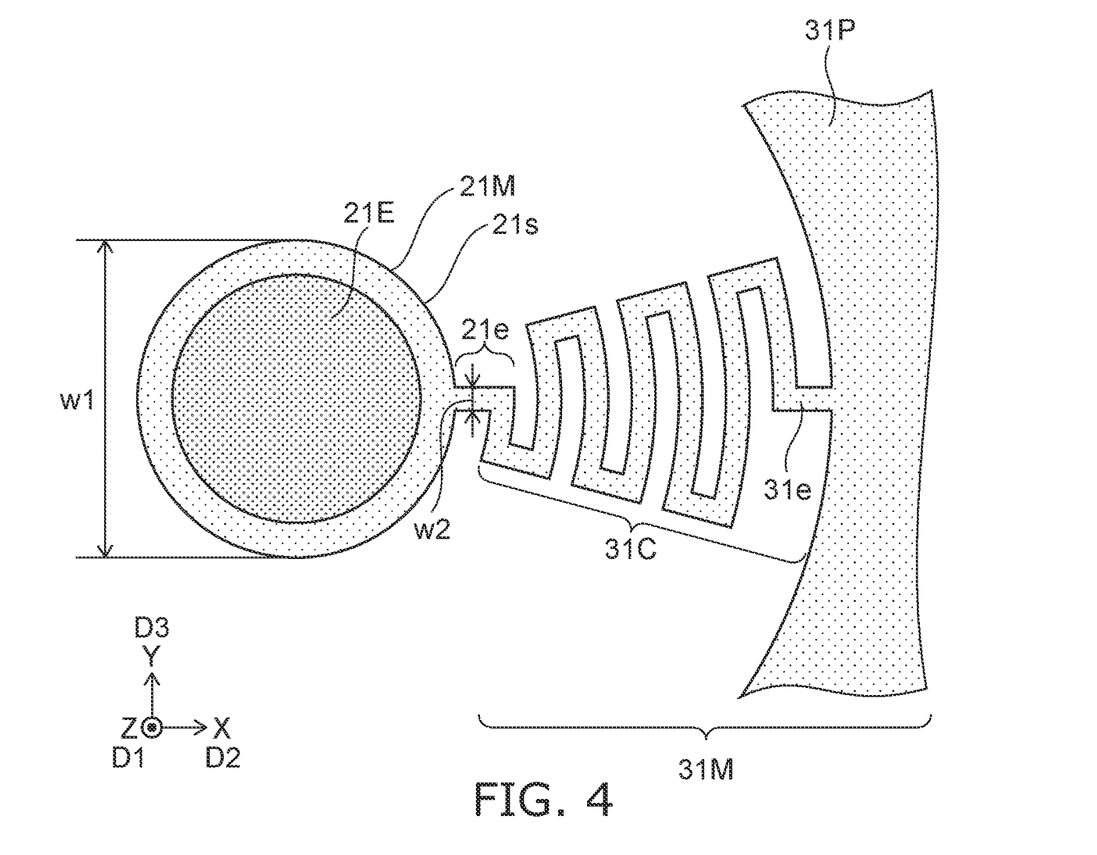
FIG. 4 is a schematic plan view illustrating a part of the sensor according to the first embodiment.

FIG. 4 is a schematic plan view illustrating a part of the sensor according to the first embodiment.

Figure 5:
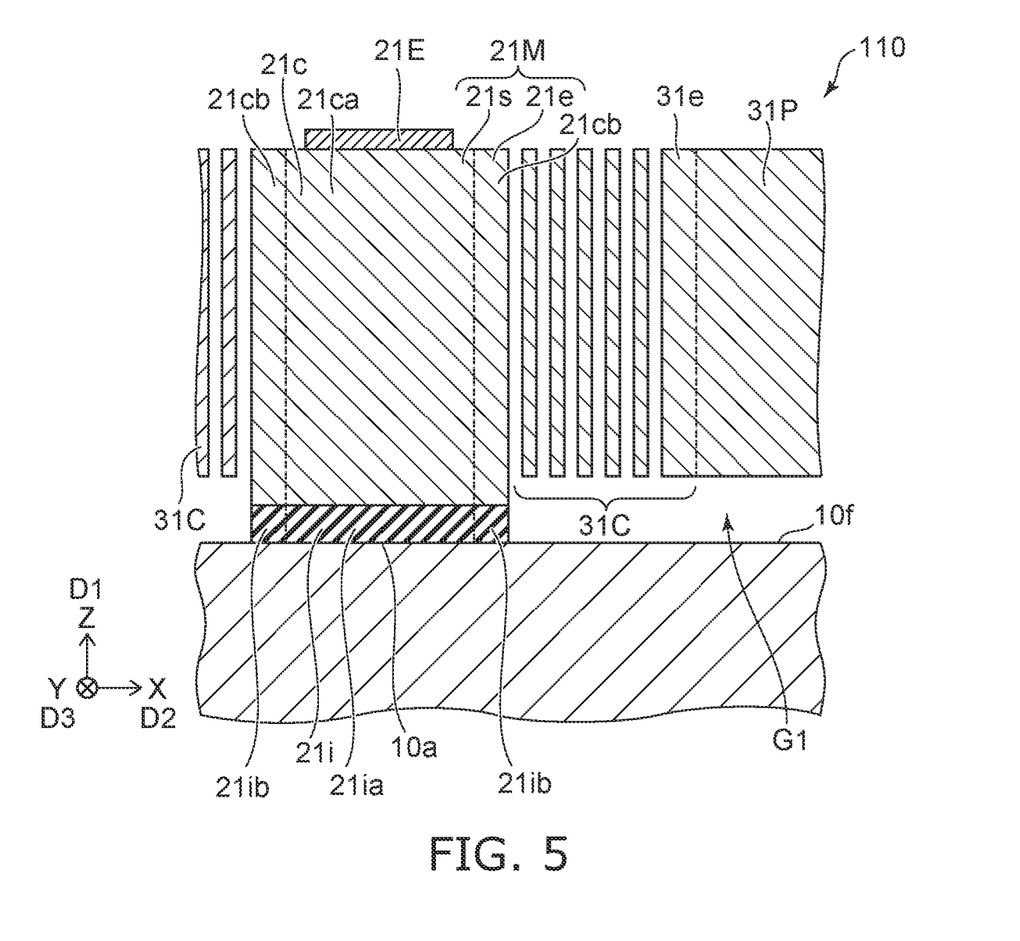
FIG. 5 is a schematic cross-sectional view illustrating a part of the sensor according to the first embodiment.

FIG. 5 is a schematic cross-sectional view illustrating a part of the sensor according to the first embodiment.

FIG. 1 is a cross-sectional view taken along the line A1-A2 of FIG. 3. FIG. 2 is a cross-sectional view taken along the line B1-B2 of FIG. 3.

As shown in FIG. 1, a sensor 110 according to the embodiment includes a base body 10s, a support member 21M, and a movable member 31M.

The base body 10s includes a first face 10f. The first face 10f includes a first base region 10a. The support member 21M is fixed to the first base region 10a.

As shown in FIGS. 1 and 4, the support member 21M includes a support portion 21s and an extending portion 21e. The extending portion 21e is connected to the support portion 21s.

As shown in FIG. 1, a first direction D1 from the first base region 10a to the support portion 21s is defined as a Z-axis direction. A direction perpendicular to the Z-axis direction is defined as an X-axis direction. A direction perpendicular to the Z-axis direction and the X-axis direction is defined as a Y-axis direction.

As shown in FIG. 4, the extending portion 21e extends along a second direction D2. The second direction D2 crosses the first direction D1. The second direction D2 is, for example, the X-axis direction.

As shown in FIG. 4, a width of the support portion 21s in a third direction D3 is defined as a first width w1. The third direction D3 crosses a plane including the first direction D1 and the second direction D2. The third direction D3 is, for example, the Y-axis direction. A width of the extending portion 21e in the third direction D3 is defined as a second width w2. The first width w1 is wider than the second width w2.

As shown in FIG. 1, the movable member 31M is supported by the extending portion 21e. A first gap G1 is provided between the first face 10f and the movable member 31M.

In the embodiment, at least a part of the extending portion 21e that supports the movable member 31M is fixed to the base body 10s. The extending portion 21e is stable. For example, deflection effects due to gravity can be reduced. For example, vibration resistance can be improved. For example, stable resonance characteristics of the movable member 31M can be obtained. A sensor with stable characteristics can be provided.

For example, an insulating layer is provided on the base body 10s, and a member that becomes the movable member 31M is provided on the insulating layer. The movable member 31M and the first gap G1 are formed by removing a portion of the member that becomes the movable member 31M and further removing a portion of the insulating layer. In the process of forming the movable member 31M, the insulating layer may be excessively removed. For example, if no insulating layer is provided between the entire extending portion 21e and the base body 10s, the extending portion 21e is unstable.

In the embodiment, an insulating layer is provided between at least part of the extending portion 21e and the base body 10s, and at least part of the extending portion 21e is fixed to the base body 10s. In the embodiment, there is a wide margin for processing in the process of forming the movable member 31M. Stable resonance characteristics of the movable member 31M are obtained by the stable extending portion 21e. For example, processing variations are suppressed. A sensor with stable characteristics can be provided.

As shown in FIGS. 1 and 5, in this example, the support member 21M includes a support conductive portion 21c and a support insulating portion 21i. As shown in FIG. 5, a portion 21ca of the support conductive portion 21c serves as the support portion 21s. Another portion 21cb of the support conductive portion 21c becomes the extending portion 21e. The portion 21ia of the support insulating portion 21i is provided between the first face 10f and the portion 21ca of the support conductive portion 21c. Another portion 21ib of the support insulating portion 21i is provided between the first face 10f and another portion 21cb of the support conductive portion 21c.

The first width w1 may be, for example, a length of the portion 21ia of the support insulating portion 21i in the third direction D3. The second width w2 may be, for example, a length of the other portion 21ib of the support insulating portion 21i in the third direction D3.

For example, the support insulating portion 21i includes at least one selected from the group consisting of oxygen and nitrogen and at least one selected from the group consisting of silicon and aluminum. The support insulating portion 21i includes, for example, silicon oxide.

For example, the support conductive portion 21c includes silicon. The support conductive portion 21c may include conductive silicon.

In the embodiment, the first width w1 is not less than 2 times and not more than 1000 times the second width w2. By the extending portion 21e being thin, movement (vibration) of the movable member 31M becomes easy.

As shown in FIG. 4, in this example, the movable member 31M includes a first connecting portion 31C and a first movable portion 31P. The first connecting portion 31C is located between the extending portion 21e and a part of the first movable portion 31P. As shown in FIG. 1, the first connecting portion 31C is supported by the extending portion 21e. The first connecting portion 31C supports the first movable portion 31P.

As shown in FIG. 4, the first connecting portion 31C may have a meander structure. A stable spring function is obtained.

As shown in FIG. 4, the movable member 31M may further include a first movable extending portion 31e. The first movable extending portion 31e extends along the second direction D2. The first movable extending portion 31e is provided between the first connecting portion 31C and the first movable portion 31P. A direction from the extending portion 21e to the first movable extending portion 31e is along the second direction D2. The first gap G1 is provided between the first face 10f and the first connecting portion 31C, between the first face 10f and the first movable extending portion 31e, and between the first face 10f and the first movable portion 31P.

As shown in FIG. 3, the first movable portion 31P is provided around the support portion 21s on a plane (for example, the X-Y plane) crossing the first direction D1. The first movable portion 31P is, for example, annular.

As shown in FIG. 3, a plurality of extending portions 21e and a plurality of first connecting portions 31C are provided. One of the multiple first connecting portion s 31C is connected to one of the multiple extending portions 21e. The extending direction of the extending portion 21e is a radial direction centered on the support portion 21s. The second direction D2 is one of the radial directions.

As shown in FIGS. 1 and 3, the sensor 110 may further include fixed conductive member 22M. As shown in FIG. 1, the first face 10f further includes a second base region 10b. The fixed conductive member 22M is fixed to the second base region 10b. The fixed conductive member 22M faces the movable member 31M in a direction crossing the first direction D1.

In this example, the first movable portion 31P includes a hole 31h along the first direction D1. The fixed conductive member 22M passes through the hole 31h. As shown in FIG. 3, a plurality of fixed conductive members 22M and a plurality of holes 31h may be provided. The plurality of fixed conductive members 22M may be provided on a circumference centered on the support portion 21s. One of the plurality of fixed conductive members 22M passes through one of the plurality of holes 31h. The support portion 21s is provided between one of the plurality of fixed conductive members 22M and another one of the plurality of fixed conductive members 22M. The one of the plurality of fixed conductive members 22M and the other one of the plurality of fixed conductive members 22M are arranged along the second direction D2 or the third direction D3.

For example, when a voltage is applied between the first movable portion 31P and the fixed conductive member 22M, the first movable portion 31P is displaced in the X-Y plane. For example, when an AC voltage is applied, the first movable portion 31P vibrates.

The first movable portion 31P is electrically connected to the support portion 21s via the first connecting portion 31C and the extending portion 21e. When a voltage is applied between the support portion 21s and the fixed conductive member 22M, the voltage is applied between the first movable portion 31P and the fixed conductive member 22M.

As shown in FIGS. 1 and 3, a support portion electrode 21E electrically connected to the support portion 21s (support member 21M) may be provided. A fixed electrode 22E electrically connected to the fixed conductive member 22M may be provided. As shown in FIG. 1, the controller 70 may be connected to these electrodes. The controller 70 may be included in the sensor 110. The controller 70 may be provided separately from the sensor 110.

The controller 70 is configured to apply an AC signal Sg1 between the support member 21M and the fixed conductive member 22M to vibrate the movable member 31M (the first movable portion 31P).

When a rotational force is applied to the movable member 31M (the first movable portion 31P) from the outside, the vibration state of the movable member 31M (the first movable part 31P) is changed. The change in vibration state is based on, for example, Coriolis force.

The controller 70 is configured to detect the state of vibration of the movable member 31M. The state of vibration of the movable member 31M changes according to the rotational force applied to the movable member 31M. By detecting the state of vibration of the movable member 31M, the rotational force applied to the movable member 31M can be detected.

As shown in FIG. 2, a part of the support insulating portion 21*i* may protrude with respect to the support conductive portion 21*c* in a direction crossing the direction (first direction D1) from the first base region 10*a* to the support member 21M.

Figure 6:
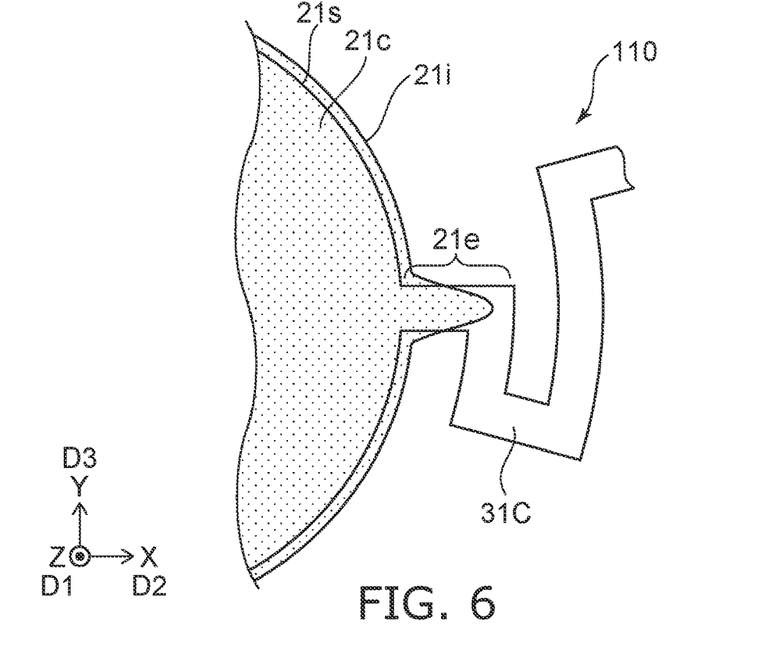
FIG. 6 is a schematic plan view illustrating part of the sensor according to the first embodiment.

FIG. 6 is a schematic plan view illustrating part of the sensor according to the first embodiment.

Figure 7:
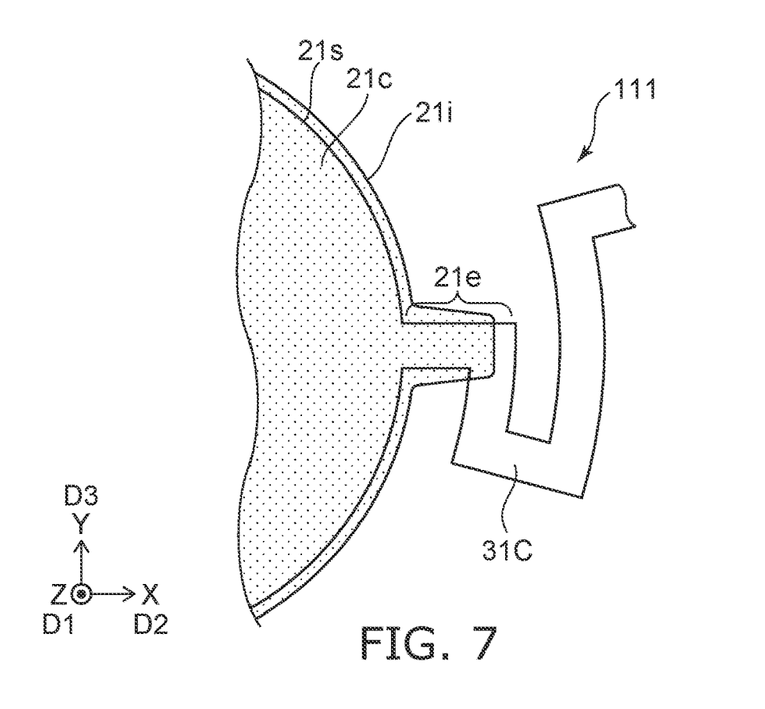
FIG. 7 is a schematic plan view illustrating a part of a sensor according to the first embodiment.

As shown in FIG. 6, in the sensor 110, the outer edge of the support insulating portion 21*i* may protrude with respect to the support conductive portion 21*c*. For example, in the portion corresponding to the extending portion 21*e*, the outer edge of the support insulating portion 21*i* may protrude in a curved shape with respect to the support conductive portion 21*c*. In the example shown in FIG. 6, a part of the support conductive portion 21*c* corresponding to the extending portion 21*e* does not overlap the support insulating portion 21*i* in the first direction D1. FIG. 7 is a schematic plan view illustrating a part of a sensor according to the first embodiment.

As shown in FIG. 7, in a sensor 111 according to the embodiment, in a part corresponding to the extending portion 21*e*, the outer edge of the support insulating portion 21*i* may protrude with respect to the support conductive portion 21*c*.

Figure 8:
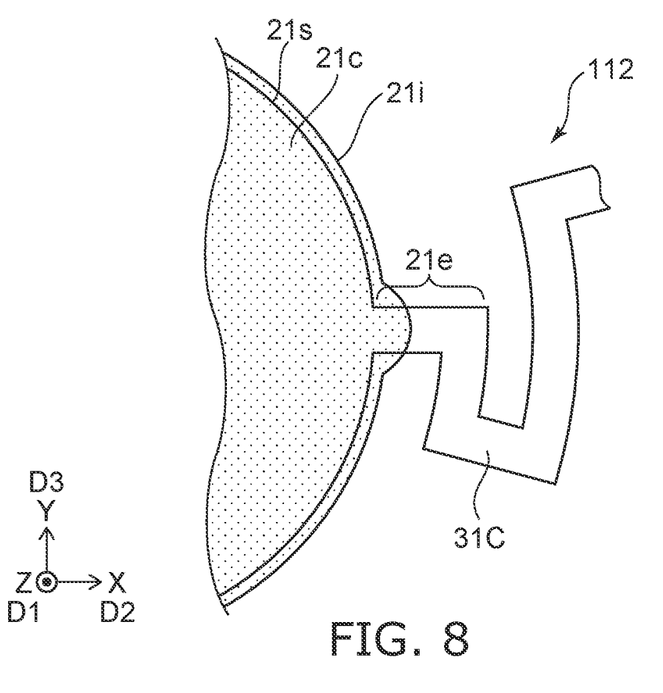
FIG. 8 is a schematic plan view illustrating a part of a sensor according to the first embodiment.

FIG. 8 is a schematic plan view illustrating a part of a sensor according to the first embodiment.

Figure 9:
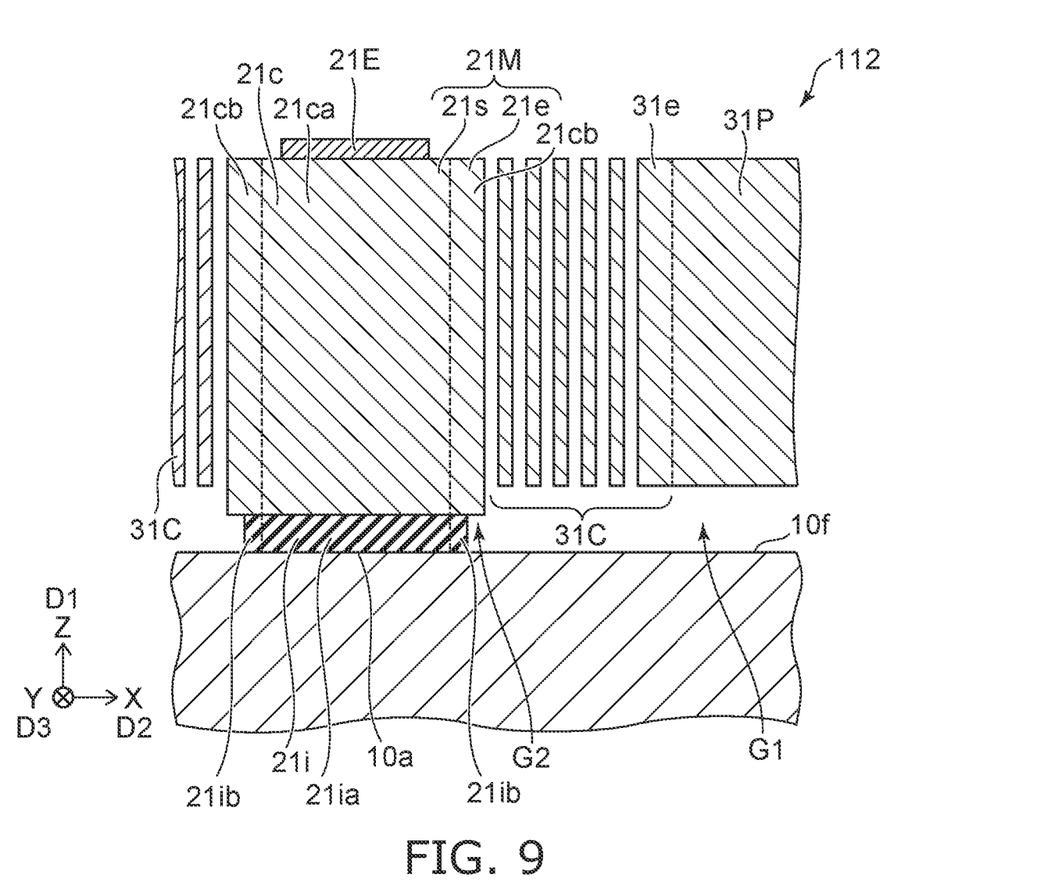
FIG. 9 is a schematic cross-sectional view illustrating a part of the sensor according to the first embodiment.

FIG. 9 is a schematic cross-sectional view illustrating a part of the sensor according to the first embodiment.

These figures illustrate a sensor 112 according to the embodiment. In the sensor 112, the amount of protrusion of the outer edge of the support insulating portion 21*i* is smaller than that of the sensor 110 and the like.

In this case, as shown in FIG. 9, a second gap G2 may be provided between the base body 10*s* and a part of the extending portion 21*e*. In the sensor 112, most of the extending portion 21*e* is stably fixed to the base body 10*s*. Stable resonance characteristics of the movable member 31M are obtained by the stable extending portion 21*e*.

Figure 10:
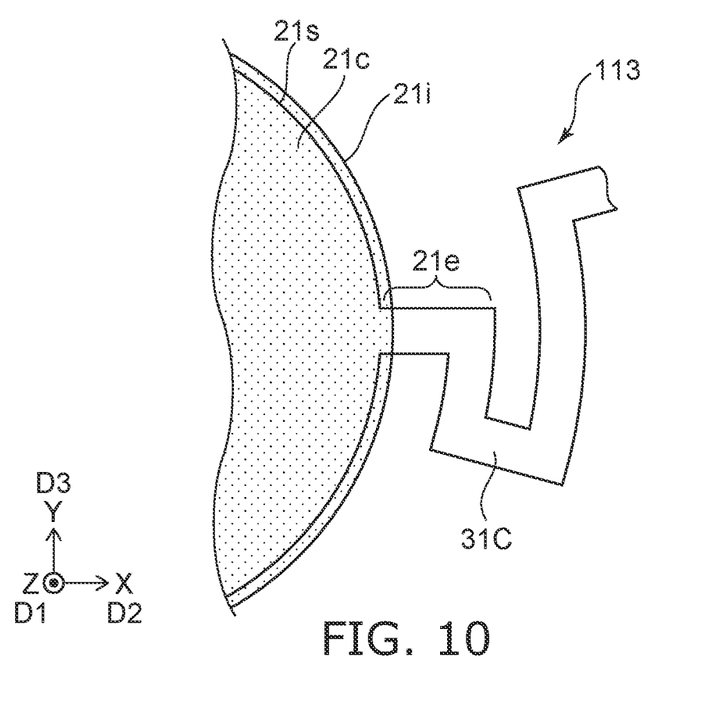
FIG. 10 is a schematic plan view illustrating a part of a sensor according to the first embodiment.

FIG. 10 is a schematic plan view illustrating a part of a sensor according to the first embodiment.

As shown in FIG. 10, in a sensor 113 according to the embodiment, the amount of protrusion of the outer edge of the support insulating portion 21*i* is smaller than that of the sensor 112. In the sensor 113, a part of the extending portion 21*e* is stably fixed to the base body 10*s*. Stable resonance characteristics of the movable member 31M are obtained by the stable extending portion 21*e*.

The configurations of the sensors 111 to 113 may be the same as those of the sensor 110 except for the above.

The sensor 113 includes the base body 10*s* (see FIG. 1), the support member 21M (see FIG. 1), and the movable member 31M (see FIG. 1). The base body 10*s* includes the first face 10*f* including a first base region 10*a*. The support member 21M is fixed to the first base region 10*a*. As shown in FIG. 1, the support member 21M includes the support conductive portion 21*c* and the support insulating portion 21*i*. As shown in FIG. 5, the portion 21*ia* of the support insulating portion 21*i* is provided between the first face 10*f* and the support conductive portion 21*c*. The other portion 21*ib* of the support insulating portion 21*i* does not overlap the support conductive portion 21*c*. As shown in FIG. 1, the movable member 31M is supported by the support member 21M. The first gap G1 is provided between the first face 10*f* and the movable member 31M. In the sensor 113, the other portion 21*ib* of the support insulating portion 21*i* protrudes with respect to the support conductive portion 21*c* in a direction crossing the direction (first direction D1) from the first base region 10*a* to the support member 21M.

Figure 11:
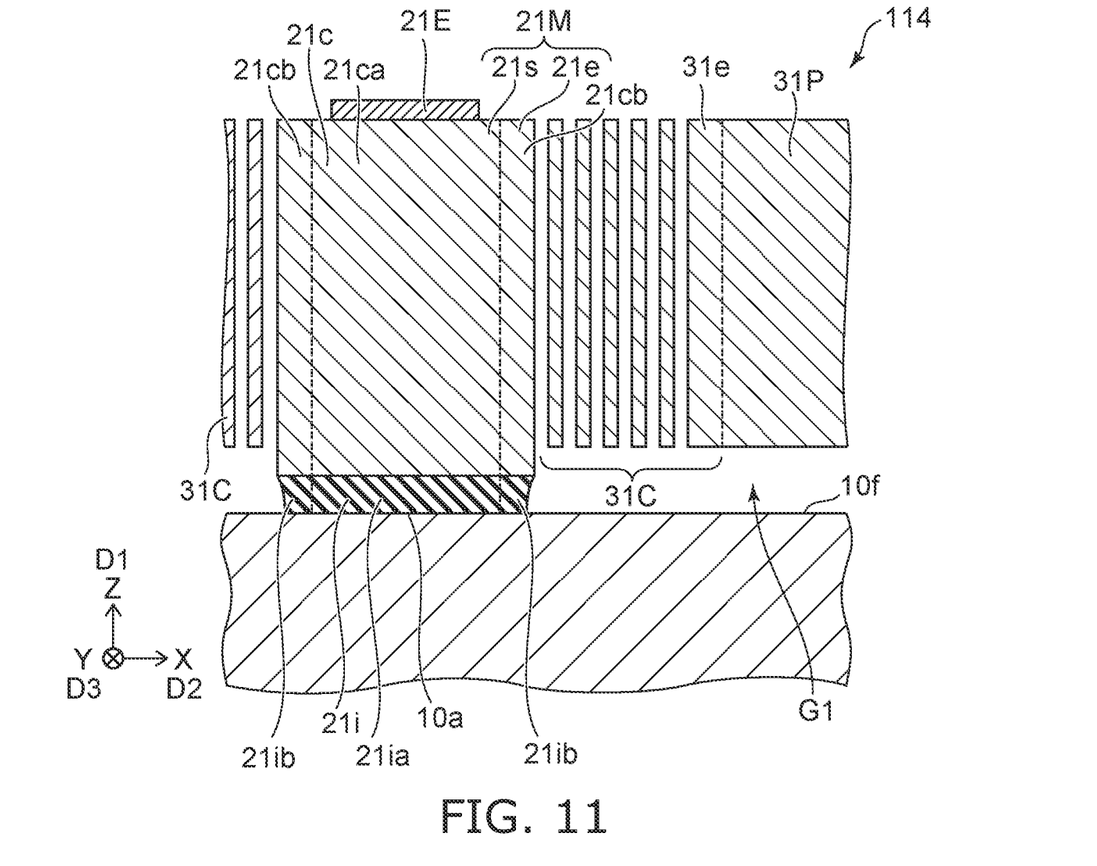
FIG. 11 is a schematic cross-sectional view illustrating a part of a sensor according to the first embodiment.

FIG. 11 is a schematic cross-sectional view illustrating a part of a sensor according to the first embodiment.

As shown in FIG. 11, in a sensor 114 according to the embodiment, a side face of the other portion 21*ib* of the support insulating portion 21*i* may be curved. Except for this, the configuration of the sensor 114 may be the same as the configuration of the sensor 110.

In the sensor 114, the other portion 21*ib* of the support insulating portion 21*i* includes a portion facing the first face 10*f* and a portion facing the other portion 21*cb* of the support conductive portion 21*c*. For example, the length along the second direction D2 of the portion facing the first face 10*f* is shorter than the length along the second direction D2 of the portion facing the other portion 21*cb* of the support conductive portion 21*c*. By such a shape, the stress concentration is relaxed. It is easy to obtain more stable characteristics.

Second Embodiment

A second embodiment relates to an electronic device.

Figure 12:
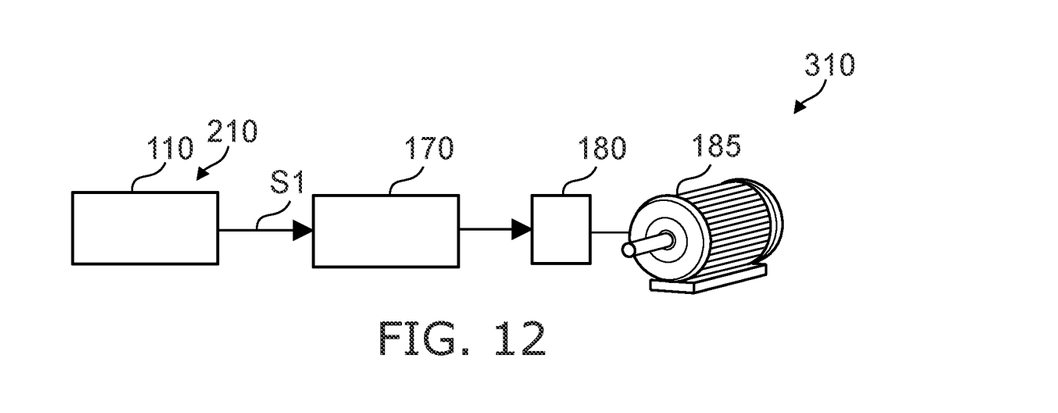
FIG. 12 is a schematic diagram illustrating an electronic device according to a second embodiment.

FIG. 12 is a schematic diagram illustrating an electronic device according to a second embodiment.

As shown in FIG. 12, an electronic device 310 according to the embodiment includes the sensors according to the embodiments and the circuit processor 170. In the example of FIG. 12, the sensor 110 (or the sensor device 210) is drawn as the sensor. The circuit processor 170 is configured to control a circuit 180 based on the signal 51 obtained from the sensor. The circuit 180 is, for example, a control circuit for a drive device 185. According to the embodiment, for example, the circuit 180 for controlling the drive device 185 can be controlled with high accuracy.

FIGS. 13A to 13H are schematic views illustrating applications of the electronic device.

Figure 13A:
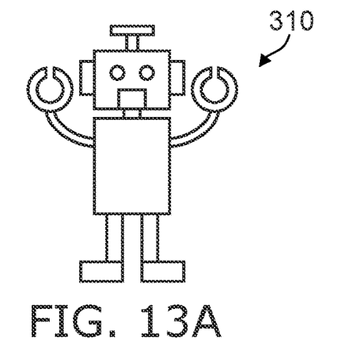
FIGS. 13A to 13H are schematic views illustrating applications of the electronic device.
Figure 13B:
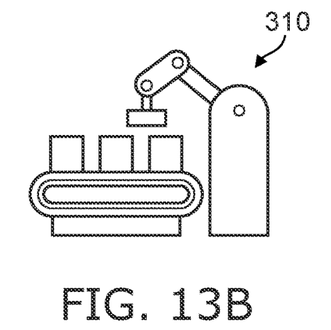
Figure 13C:
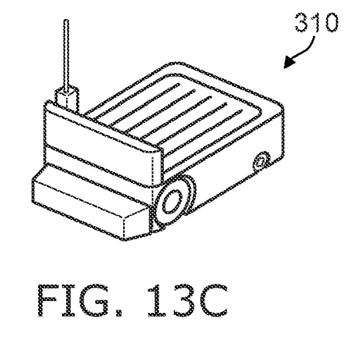
Figure 13D:
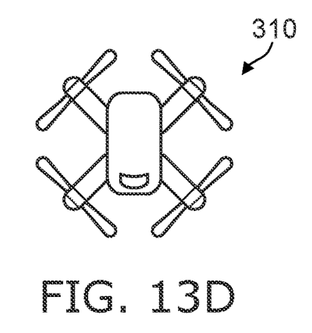
Figure 13E:
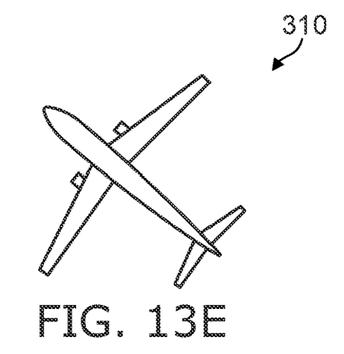
Figure 13F:
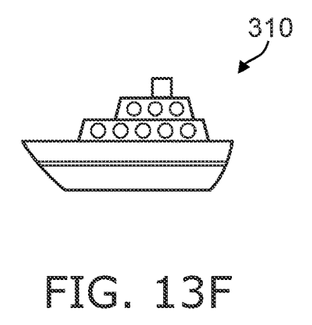
Figure 13G:
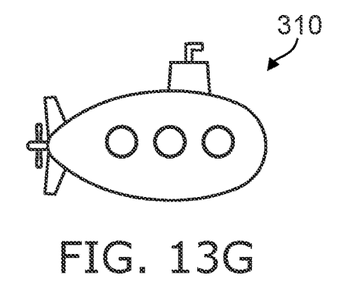
Figure 13H:
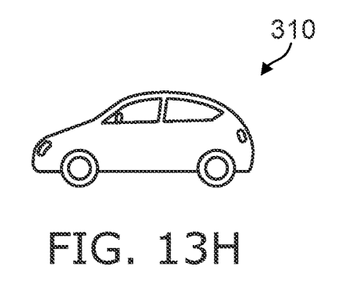

As shown in FIG. 13A, the electronic device 310 may be at least a portion of a robot. As shown in FIG. 13B, the electronic device 310 may be at least a portion of a machining robot provided in a manufacturing plant, etc. As shown in FIG. 13C, the electronic device 310 may be at least a portion of an automatic guided vehicle inside a plant, etc. As shown in FIG. 13D, the electronic device 310 may be at least a portion of a drone (an unmanned aircraft). As shown in FIG. 13E, the electronic device 310 may be at least a portion of an airplane. As shown in FIG. 13F, the electronic device 310 may be at least a portion of a ship. As shown in FIG. 13G, the electronic device 310 may be at least a portion of a submarine. As shown in FIG. 13H, the electronic device 310 may be at least a portion of an automobile. The electronic device 310 according to the third embodiment may include, for example, at least one of a robot or a moving body.

The embodiment may include the following configuration (for example, technical proposals).

Configuration 1

A sensor, comprising:
a base body including a first face including a first base region;
a support member fixed to the first base region, the support member including a support portion and an extending portion, the extending portion being connected to the support portion, the extending portion extending along a second direction crossing a first direction from the first base region to the support portion, a first width of the support portion in a third direction crossing a plane including the first direction and the second direction being wider than a second width of the extending portion in the third direction; and a movable member supported by the extending portion, a first gap being provided between the first face and the movable member.

Configuration 2

The sensor according to Configuration 1, wherein a second gap is provided between the base body and a part of the extending portion.

Configuration 3

The sensor according to Configuration 1 or 2, wherein
the support member includes a support conductive portion and a support insulating portion,
a portion of the support conductive portion serves as the supporting portion,
another portion of the support conductive portion serves as the extending portion,
a portion of the support insulating portion is provided between the first face and the portion of the support conductive portion, and
another portion of the support insulating portion is provided between the first face and the other portion of the support conductive portion.

Configuration 4

The sensor according to Configuration 3, wherein
the first width is a length of the portion of the support insulating portion in the third direction, and
the second width is a length of the other portion of the support insulating portion in the third direction.

Configuration 5

The sensor according to Configuration 4, wherein the support insulating portion includes at least one selected from the group consisting of oxygen and nitrogen, and at least one selected from the group consisting of silicon and aluminum.

Configuration 6

The sensor according to Configuration 5, wherein the supporting conductive portion includes silicon.

Configuration 7

The sensor according to any one of Configurations 1 to 6, wherein the first width is not less than 2 times and not more than 1000 times the second width.

Configuration 8

The sensor according to any one of Configurations 1 to 7, wherein
the movable member includes a first connection portion and a first movable portion,
the first connecting portion is located between the extending portion and a part of the first movable portion,
the first connection portion is supported by the extending portion, and
the first connection portion supports the first movable portion.

Configuration 9

The sensor according to Configuration 8, wherein the first connection portion has a meander structure.

Configuration 10

The sensor according to Configuration 8 or 9, wherein
the movable member further includes a first movable extending portion,
the first movable extending portion is provided between the first connecting portion and the first movable portion, and
a direction from the extending portion to the first movable extending portion is along the second direction.

Configuration 11

The sensor according to any one of Configurations 8 to 10, wherein the first movable portion is provided around the support portion in a plane crossing the first direction.

Configuration 12

The sensor according to Configuration 11, wherein
a plurality of the extending portions and a plurality of the first connecting portions are provided, and
one of the plurality of first connecting portions is connected to one of the plurality of extending portions.

Configuration 13

The sensor according to any one of Configurations 8 to 12, further comprising a fixed conductive member,
the first face further including a second base region,
the fixed conductive member being fixed to the second base region, and
the fixed conductive member facing the movable member in a direction crossing the first direction.

Configuration 14

The sensor according to Configuration 13, wherein
the first movable portion includes a hole along the first direction, and
the fixed conductive member passes through the hole.

Configuration 15

The sensor according to Configuration 13 or 14, further comprising a controller,
the controller being configured to vibrate the movable member by applying an AC signal between the support member and the fixed conductive member.

Configuration 16

The sensor according to Configuration 15, wherein the controller is configured to detect a state of a vibration of the movable member being configured to change according to a rotational force applied to the movable member.

Configuration 17

A sensor, comprising:
a base body including a first face including a first base region;
a support member fixed to the first base region, the support member including a support conductive portion and a support insulating portion, a portion of the support insulating portion being provided between the first face and the support conductive portion, another portion of the support insulating portion not overlapping the support conductive portion; and
a movable member supported by the support member, a first gap being provided between the first face and the movable member.

Configuration 18

The sensor according to Configuration 17, wherein the other portion of the support insulating portion protrudes from the support conductive portion in a direction crossing a first direction from the first base region to the support member.

Configuration 19

An electronic device, comprising:
the sensor according to any one of Configurations 1 to 18; and
a circuit controller configured to control a circuit based on a signal obtained from the sensor.

Configuration 20

The device according to Configuration 19, wherein the electronic device includes at least one of a robot or a mobile body.

According to the embodiments, it is possible to provide a sensor and an electronic device with stable characteristics.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as base bodies, support portion, movable portion, electrodes, insulating portion, circuit portion, controller, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors and electronic devices practicable by an appropriate design modification by one skilled in the art based on the sensors and electronic devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
    a base body including a first face including a first base region;
    a support member fixed to the first base region, the support member including a support portion and an extending portion, the extending portion being connected to the support portion, the extending portion extending along a second direction crossing a first direction from the first base region to the support portion, a first width of the support portion in a third direction crossing a plane including the first direction and the second direction being wider than a second width of the extending portion in the third direction; and
    a movable member supported by the extending portion, a first gap being provided between the first face and the movable member,
    wherein
        the support member includes a support conductive portion and a support insulating portion,
        a portion of a support insulating portion is provided between the first face and a portion of the support conductive portion,
        another portion of the support insulating portion is provided between the first face and another portion of the support conductive portion, and
        the another portion of the support insulating portion protrudes from the support conductive portion in a direction which crosses a first direction from the first base region to the support member.

2. The sensor according to claim 1, wherein a second gap is provided between the base body and a part of the extending portion.

3. The sensor according to claim 1, wherein
    the first width is a length of the portion of the support insulating portion in the third direction, and
    the second width is a length of the other portion of the support insulating portion in the third direction.

4. The sensor according to claim 3, wherein the support insulating portion includes at least one selected from the group consisting of oxygen and nitrogen, and at least one selected from the group consisting of silicon and aluminum.

5. The sensor according to claim 4, wherein the supporting conductive portion includes silicon.

6. The sensor according to claim 1, wherein the first width is not less than 2 times and not more than 1000 times the second width.

7. The sensor according to claim 1, wherein
    the movable member includes a first connection portion and a first movable portion,
    the first connection portion is located between the extending portion and a part of the first movable portion,
    the first connection portion is supported by the extending portion, and
    the first connection portion supports the first movable portion.

8. The sensor according to claim 7, wherein the first connection portion has a meander structure.

9. The sensor according to claim 7, wherein
    the movable member further includes a first movable extending portion,
    the first movable extending portion is provided between the first connection portion and the first movable portion, and
    a direction from the extending portion to the first movable extending portion is along the second direction.

10. The sensor according to claim 7, wherein the first movable portion is provided around the support portion in a plane crossing the first direction.

11. The sensor according to claim 10, wherein
    the support member includes a plurality of the extending portions and a plurality of the first connecting portions, and
    one of the plurality of first connecting portions is connected to one of the plurality of extending portions.

12. The sensor according to claim 7, further comprising a fixed conductive member,
    the first face further including a second base region,
    the fixed conductive member being fixed to the second base region, and
    the fixed conductive member facing the movable member in a direction crossing the first direction.

13. The sensor according to claim 12, wherein
    the first movable portion includes a hole along the first direction, and
    the fixed conductive member passes through the hole.

14. The sensor according to claim 12, further comprising a controller,
    the controller being configured to vibrate the movable member by applying an AC signal between the support member and the fixed conductive member.

15. The sensor according to claim 14, wherein the controller is configured to detect a state of a vibration of the movable member being configured to change according to a rotational force applied to the movable member.

16. An electronic device, comprising:
   the sensor according to claim 1; and
   a circuit controller configured to control a circuit based on a signal obtained from the sensor.

17. The device according to claim 16, wherein the electronic device includes at least one of a robot or a mobile body.

18. A sensor, comprising:
   a base body including a first face including a first base region;
   a support member fixed to the first base region, the support member including a support conductive portion and a support insulating portion, a portion of the support insulating portion being provided between the first face and the support conductive portion, another portion of the support insulating portion not overlapping the support conductive portion; and
   a movable member supported by the support member, a first gap being provided between the first face and the movable member,
   wherein the another portion of the support insulating portion protrudes from the support conductive portion in a direction which crosses a first direction from the first base region to the support member.

* * * * *